United States Patent
Agarwal et al.

(10) Patent No.: US 11,683,597 B1
(45) Date of Patent: Jun. 20, 2023

(54) SYSTEMS AND METHODS FOR MULTI-DIRECTIONAL IMAGING DURING INDENTATION

(71) Applicants: Arvind Agarwal, Miami, FL (US); Darryl Dickerson, Miami, FL (US); Lihua Lou, Miami, FL (US); Mukesh Roy, Miami, FL (US)

(72) Inventors: Arvind Agarwal, Miami, FL (US); Darryl Dickerson, Miami, FL (US); Lihua Lou, Miami, FL (US); Mukesh Roy, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/811,185

(22) Filed: Jul. 7, 2022

(51) Int. Cl.
*H04N 23/90* (2023.01)
*H04N 13/204* (2018.01)
*H04N 21/2187* (2011.01)

(52) U.S. Cl.
CPC .......... *H04N 23/90* (2023.01); *H04N 13/204* (2018.05); *G06T 2207/30024* (2013.01); *H04N 21/2187* (2013.01)

(58) Field of Classification Search
CPC .. H04N 23/90; H04N 13/204; H04N 21/2187; G06T 2207/30024
See application file for complete search history.

(56) References Cited

U.S. PATENT DOCUMENTS

| | | | | |
|---|---|---|---|---|
| 8,499,645 | B2 * | 8/2013 | Chasiotis | D02G 3/22 73/831 |
| 10,492,691 | B2 * | 12/2019 | Wortman | A61B 5/0077 |
| 10,645,920 | B2 * | 5/2020 | Litwin | F41A 23/18 |
| 2012/0082362 | A1 * | 4/2012 | Diem | A61B 5/0075 382/133 |
| 2018/0014529 | A1 * | 1/2018 | Litwin | F41B 5/1453 |
| 2018/0306691 | A1 * | 10/2018 | Goenezen | A61B 5/0053 |
| 2021/0145608 | A1 * | 5/2021 | Herr | A61B 8/0825 |
| 2022/0042892 | A1 * | 2/2022 | Lee | G01N 3/068 |
| 2022/0187133 | A1 * | 6/2022 | Zhou | G02B 27/141 |

* cited by examiner

*Primary Examiner* — Boubacar Abdou Tchoussou
(74) *Attorney, Agent, or Firm* — Saliwanchik, Lloyd & Eisenschenk

(57) ABSTRACT

Systems and methods for multi-directional imaging in coupling with an indentation device are provided. The systems and methods can enable in situ multi-directional and full-field interfacial force response on soft matter. With more than two two-dimensional (2D) plane videos and/or images, the in situ nano-, micro-, and meso-scale time-dependent damage responses at the three-dimensional (3D) level can be constructed. Based on the obtained 2D and 3D videos and/or images, the underlying dynamic force response and fatigue mechanisms can be observed using a digital image correlation technique.

18 Claims, 7 Drawing Sheets

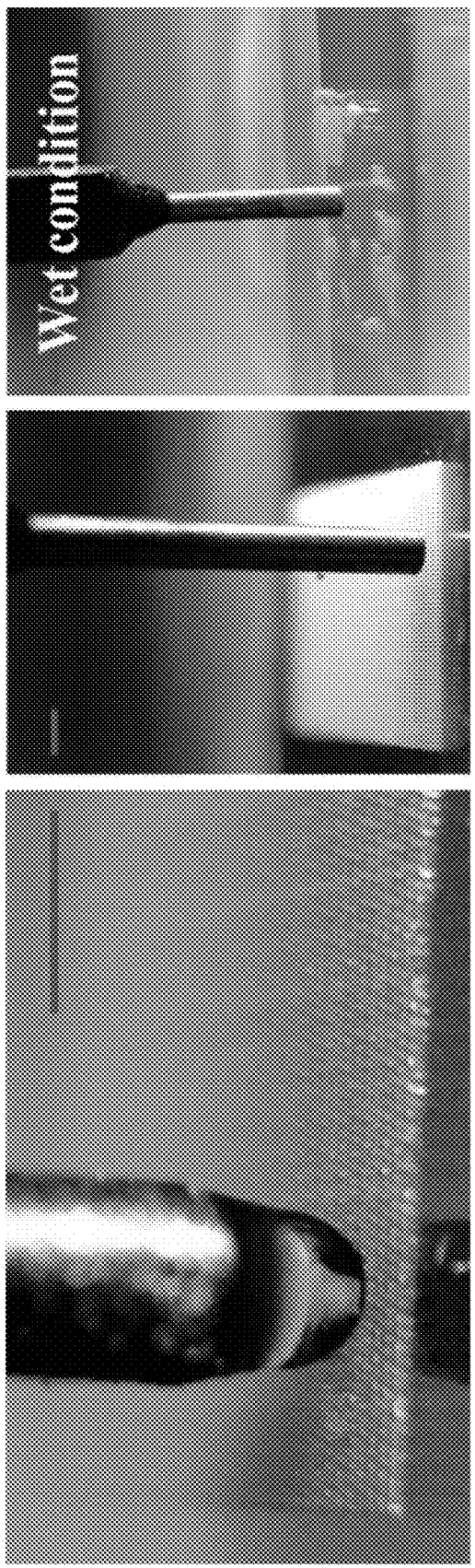

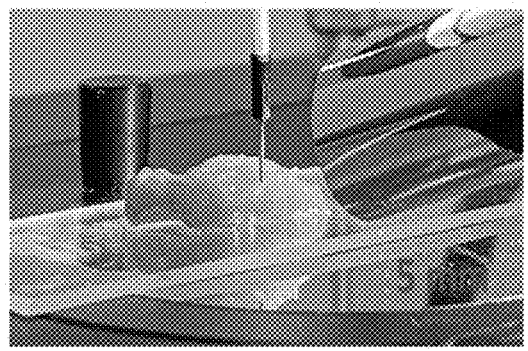 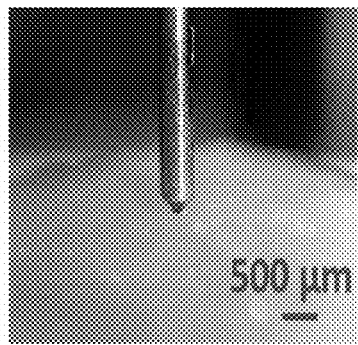 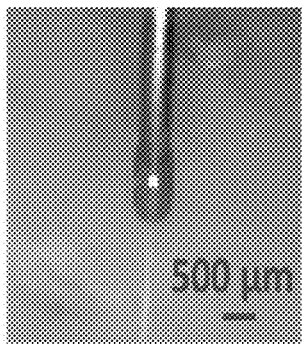
FIG. 7(a)　　　　　　　　FIG. 7(b)　　　　　　FIG. 7(c)
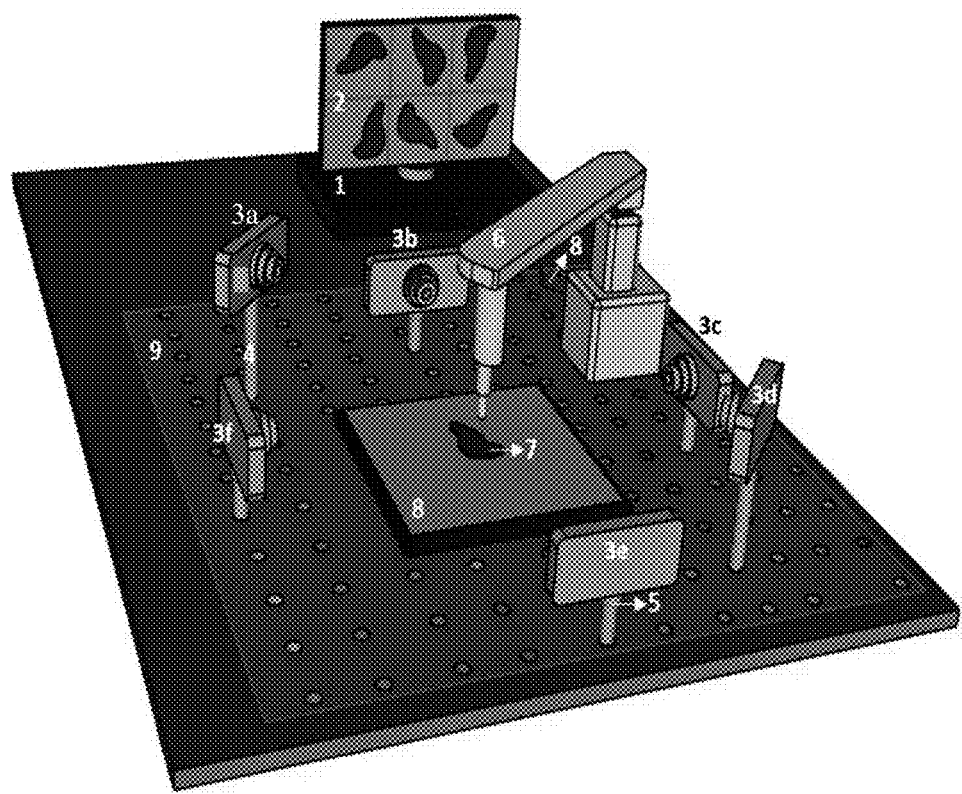
FIG. 8

SYSTEMS AND METHODS FOR MULTI-DIRECTIONAL IMAGING DURING INDENTATION

GOVERNMENT SUPPORT

This invention was made with government support under EEC-1647837 awarded by the National Science Foundation (NSF). The government has certain rights in the invention.

BACKGROUND

In situ indentation devices operate inside a scanning electron microscope (SEM) to allow imaging and observation of the indentation process. The imaging system provides additional information on the fracture mechanisms of materials, including crack initiation and propagation. However, a major limitation posed by in situ indentation within an SEM is the "dry requirement" due to the testing being performed under a high vacuum. Biological samples with moisture can interfere with the ability of the SEM to achieve sufficient vacuum conditions. In order to image soft matter within these systems, the matter must be dehydrated, creating significant changes in structure and function. This is also problematic because native and engineered biological tissues, as well as materials used for tissue engineering (such as polymer scaffolds, hydrogels, and fibers), are hydrated soft matter.

BRIEF SUMMARY

Embodiments of the subject invention provide novel and advantageous systems and methods for multi-directional imaging in coupling with an indentation device that can enable in situ multi-directional and full-field interfacial force response on soft matter. With more than two two-dimensional (2D) plane videos and/or images, the in situ nano-, micro-, and meso-scale time-dependent damage responses at the three-dimensional (3D) level can be constructed. Based on the obtained 2D and 3D videos and/or images, the underlying dynamic force response and fatigue mechanisms can be observed using a digital image correlation (DIC) technique.

In an embodiment, a system for multi-directional imaging during an indentation of a sample can comprise: a central control unit; a display in operable communication with the central control unit; and a plurality of cameras in operable communication with the central control unit. The plurality of cameras can comprise: a first camera configured to capture first images of a first view of the sample being indented by an indenter device; and a second camera configured to capture second images of a second view of the sample being indented by the indenter device. The central control unit can be configured to receive a plurality of images from the plurality of cameras and perform a DIC process (e.g., a 2D/3D DIC process) on the plurality of images to determine mechanical properties of the sample. The first view can be different from the second view, and the plurality of images can comprise the first images and the second images. The system can further comprise the indenter device and/or a sample stage on which the sample is disposed, the sample stage being disposed below an indenter probe of the indenter device. The sample can be, for example, a soft matter sample (e.g., a biological sample). The system can further comprise a surface comprising a plurality of holes, and each camera of the plurality of cameras can be disposed on a stand that is removably inserted into a hole of the plurality of holes. The first view can capture a position of the indenter in the sample along a first direction (e.g., an x-direction), and the second view can capture a position of the indenter in the sample along a second direction (e.g., a y-direction) perpendicular to the first direction. The system can be configured to operate during in situ multi-directional imaging for both a wet condition and a dry condition during the indentation of the sample. The plurality of cameras can further comprise a third camera configured to capture third images of a third view of the sample being indented by an indenter device, the third view being different from the first view and the second view, and the plurality of images further comprising the third images. The plurality of cameras can further comprise: a fourth camera configured to capture fourth images of a fourth view of the sample being indented by an indenter device; a fifth camera configured to capture fifth images of a fifth view of the sample being indented by an indenter device; and/or a sixth camera configured to capture sixth images of a sixth view of the sample being indented by an indenter device. The first view, the second view, the third view, the fourth view, the fifth view, and the sixth view can all be different from each other, and the plurality of images can further comprise the fourth images, the fifth images, and/or the sixth images. The first images, the second images, the third images, the fourth images, the fifth images, and/or the sixth images can be displayed on the display. The plurality of images can comprise a plurality of videos, such that the first images, the second images, the third images, the fourth images, the fifth images, and/or the sixth images can comprise first videos, second videos, third videos, fourth videos, fifth videos, and/or sixth videos, respectively.

In another embodiment, a method for multi-directional imaging during an indentation of a sample can comprise: providing a system comprising a central control unit, a display in operable communication with the central control unit, and a plurality of cameras in operable communication with the central control unit; capturing, by a first camera of the plurality of cameras, first images of a first view of the sample being indented by an indenter device; capturing, by a second camera of the plurality of cameras, second images of a second view of the sample being indented by an indenter device; receiving, by the central control unit, a plurality of images from the plurality of cameras; and performing, by the central control unit, a DIC process (e.g., a 2D/3D DIC process) on the plurality of images to determine mechanical properties of the sample. The first view can be different from the second view, and the plurality of images can comprise the first images and the second images. The sample can be a soft matter sample (e.g., a biological sample). The system can further comprise the indenter device and/or a sample stage on which the sample is disposed, the sample stage being disposed below an indenter probe of the indenter device. The system can further comprise a surface comprising a plurality of holes, and each camera of the plurality of cameras can be disposed on a stand that is removably inserted into a hole of the plurality of holes. The first view can capture a position of the indenter in the sample along a first direction (e.g., an x-direction), and the second view can capture a position of the indenter in the sample along a second direction (e.g., a y-direction) perpendicular to the first direction. The method can be performed during in situ multi-directional imaging for both a wet condition and a dry condition during the indentation of the sample. The plurality of cameras can further comprise a third camera configured to capture third images of a third view of the sample being indented by an indenter device, the third view being different from the first view and the second view, and the plurality of images further comprising the third images. The plurality of cameras can further comprise: a fourth camera configured to capture fourth images of a fourth view of the sample being indented by an indenter device; a fifth camera configured to capture fifth images of a fifth view of the sample being indented by an indenter device; and/or a sixth camera configured to capture sixth images of a sixth view of the sample being indented by an indenter device. The first view, the second view, the third view, the fourth view, the fifth view, and the sixth view can all be different from each other, and the plurality of images can further comprise the fourth images, the fifth images, and/or the sixth images. The method can further comprise displaying the first images, the second images, the third images, the fourth images, the fifth images, and/or the sixth images on the display. The plurality of images can comprise a plurality of videos, such that the first images, the second images, the third images, the fourth images, the fifth images, and/or the sixth images can comprise first videos, second videos, third videos, fourth videos, fifth videos, and/or sixth videos, respectively.

BRIEF DESCRIPTION OF DRAWINGS

FIG. 3(a) shows an initial status, and FIG. 3(b) shows maximum adhesion. The scale bar is 1 millimeter (mm).

FIGS. 4(a) and 4(b) show color maps in for an initial status and maximum adhesion, respectively. FIG. 4(c) shows a plot of picture number versus y-direction displacement (in μm), and FIG. 4(d) shows a plot of adhesion force (in microNewtons (μN).

FIGS. 6(a)-6(c) show images from a dual camera system, according to an embodiment of the subject invention, for monitoring an indentation process on scaffolds designed by two-photon direct laser writing at dry and wet conditions. The scale bar in each of FIGS. 6(a)-6(c) is 500 μm.

FIGS. 7(a)-7(c) show images from a dual camera system, according to an embodiment of the subject invention, for monitoring an indentation process on porcine tissues. The scale bar in FIG. 7(a) is 5 mm, and the scale bar in each of FIGS. 7(b) and 7(c) is 500 μm.

FIG. 8 shows a schematic view of a multi-camera (e.g., six-camera) system coupled with an indentation device, according to an embodiment of the subject invention.

DETAILED DESCRIPTION

Embodiments of the subject invention provide novel and advantageous systems and methods for multi-directional imaging in coupling with an indentation device that can enable in situ multi-directional and full-field interfacial force response on soft matter. With more than two two-dimensional (2D) plane videos and/or images, the in situ nano-, micro-, and meso-scale time-dependent damage responses at the three-dimensional (3D) level can be constructed. Based on the obtained 2D and 3D videos and/or images, the underlying dynamic force response and fatigue mechanisms can be observed using a digital image correlation (DIC) technique.

Because native and engineered biological tissues, as well as materials used for tissue engineering (such as polymer scaffolds, hydrogels, and fibers), are hydrated soft matter, the ability to evaluate the mechanical response in wet conditions in an indentation device or system is essential. In related art systems, the sample must be conductive to ensure dissipation of static charges, resulting in structure images. However, a surface coating or ion treatment can significantly affect the mechanical properties of soft matter. Embodiments of the subject invention advantageously provide high-resolution, multi-directional imaging systems, in coupling with indentation devices, that are specifically configured for soft matter testing and allow testing at dry and wet conditions without any requirement for the sample to be conductive.

Figure 1:
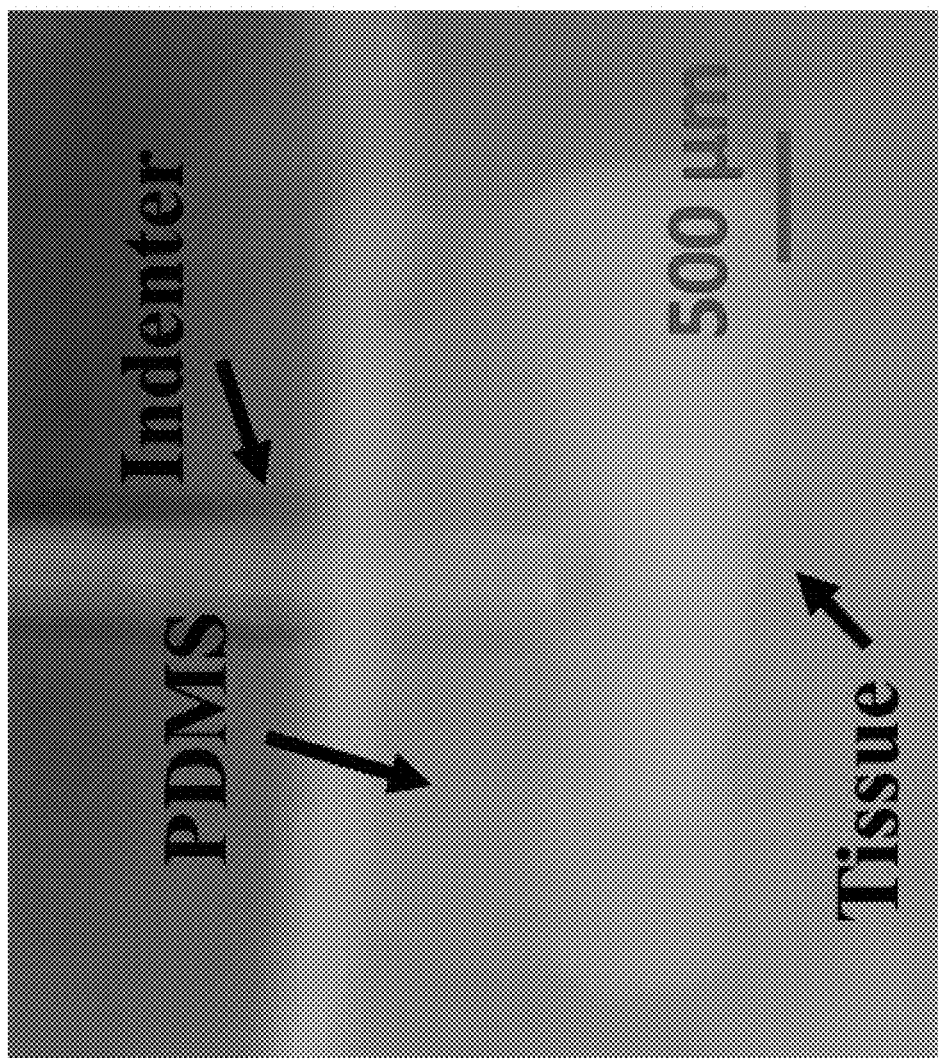
FIG. 1 shows an image from a first camera of a system, according to an embodiment of the subject invention, for monitoring an indentation process on alive human induced pluripotent stem cell (hiPSC)-derived engineering cardiac tissues. A conospherical indenter with a diameter of 50 micrometers (μm) was utilized for the image. The tissue was suspended between two polydimethylsiloxane (PDMS) pillars.
Figure 2:
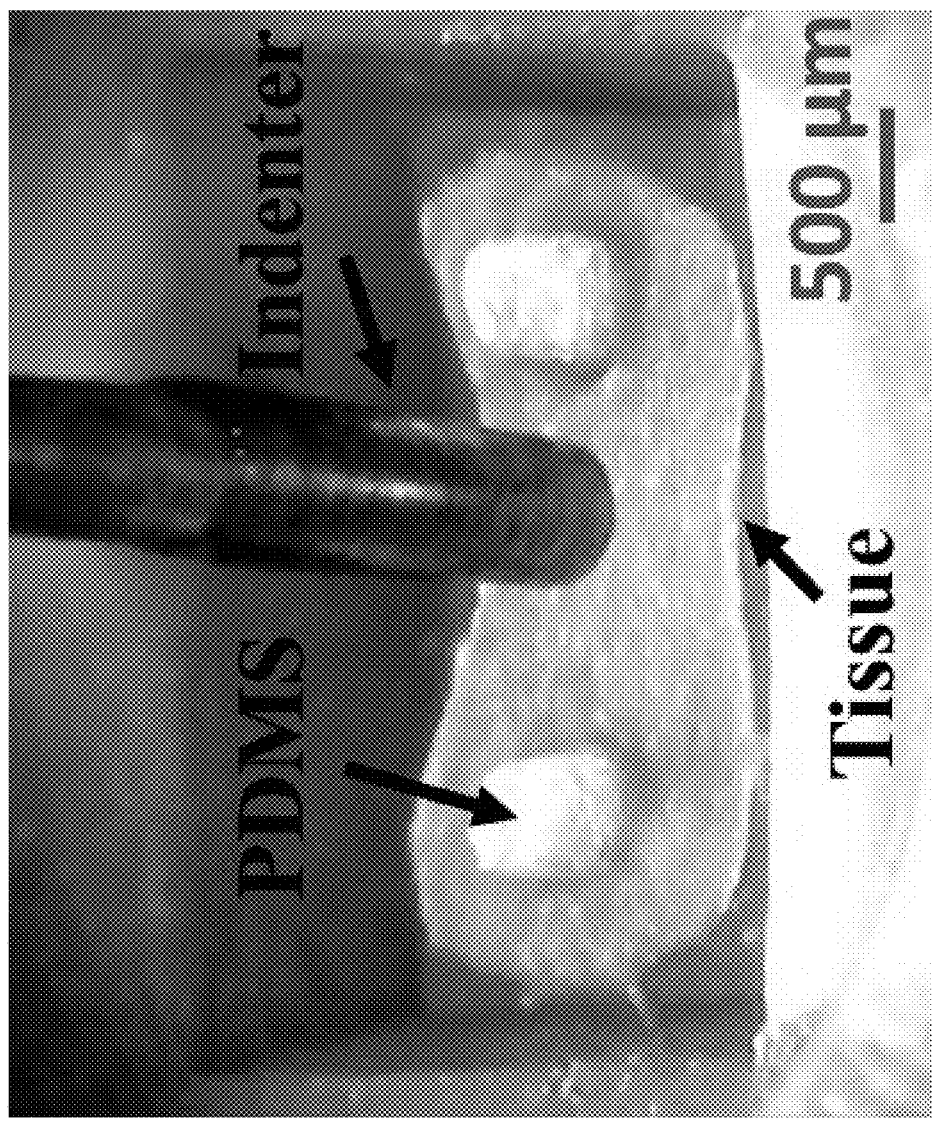
FIG. 2 shows an image from a second camera of a system, according to an embodiment of the subject invention, for monitoring an indentation process on alive hiPSC-derived engineering cardiac tissues.

One of the barriers to soft matter indentation in dry and wet conditions in the related art, especially for non-uniform samples with sizes from 400 nanometers (nm)-1000 micrometers (μm), is difficulty in capturing probe and sample contact. In order to view varied local mechanics, in an embodiment of the subject invention a dual-camera system can enable clear detection of contact between a probe (diameter of, e.g., 10 nm-10 millimeters (mm)) and soft matter. This approach enables the measurement of location-specific mechanical response. FIGS. 1 and 2 show images of an example of applying the dual-camera system to measure the mechanics of live human induced pluripotent stem cell (hiPSC)-derived engineering cardiac tissue.

Referring to FIGS. 1 and 2, the engineered cardiac tissues were immersed with a cell culture medium during the testing process. A first camera (FIG. 1) provides information on the indenter x-direction location (along with the length of the tissue measured in the x-direction) and probe and tissue surface contact. A second camera 2 (FIG. 2) locates the indenter y-direction position (along with the width of tissue measured in the y-direction). Though FIGS. 1 and 2 show an example where the pillars are polydimethylsiloxane (PDMS), this is for exemplary purposes only and should not be construed as limiting; other polymers or non-polymer materials can be used for the pillars. Also, though FIGS. 1 and 2 show an example where a conospherical indenter (with a diameter of 50 μm) was utilized, this is for exemplary purposes only and should not be construed as limiting; other shapes and/or diameters can be used for the indenter.

Another barrier to soft matter indentation in the related art is the time-dependent force response. Due to inherent viscoelasticity and poroelasticity, the mechanical response of soft matters is highly dependent on the time, rate, and frequency of applied force. Currently, the measurement of viscoelasticity and other time-dependent behavior is dependent on monitoring and characterizing the mechanical properties at fixed time points. The obtained data can be used to model and predict the performance using Maxwell units together with linear springs and dashpots. The multi-directional imaging systems of embodiments of the subject invention provide unbiased videos to decipher the elasticity and viscoelasticity of soft matter with the help of a digital image analysis technique, providing a deeper understanding of full-field multiscale deformation and recoverability mechanisms. FIGS. 3(a), 3(b), and 4(a)-4(d) show an example of measuring and analyzing the viscoelasticity of a single nanofiber.

Figures 3A, 3B:
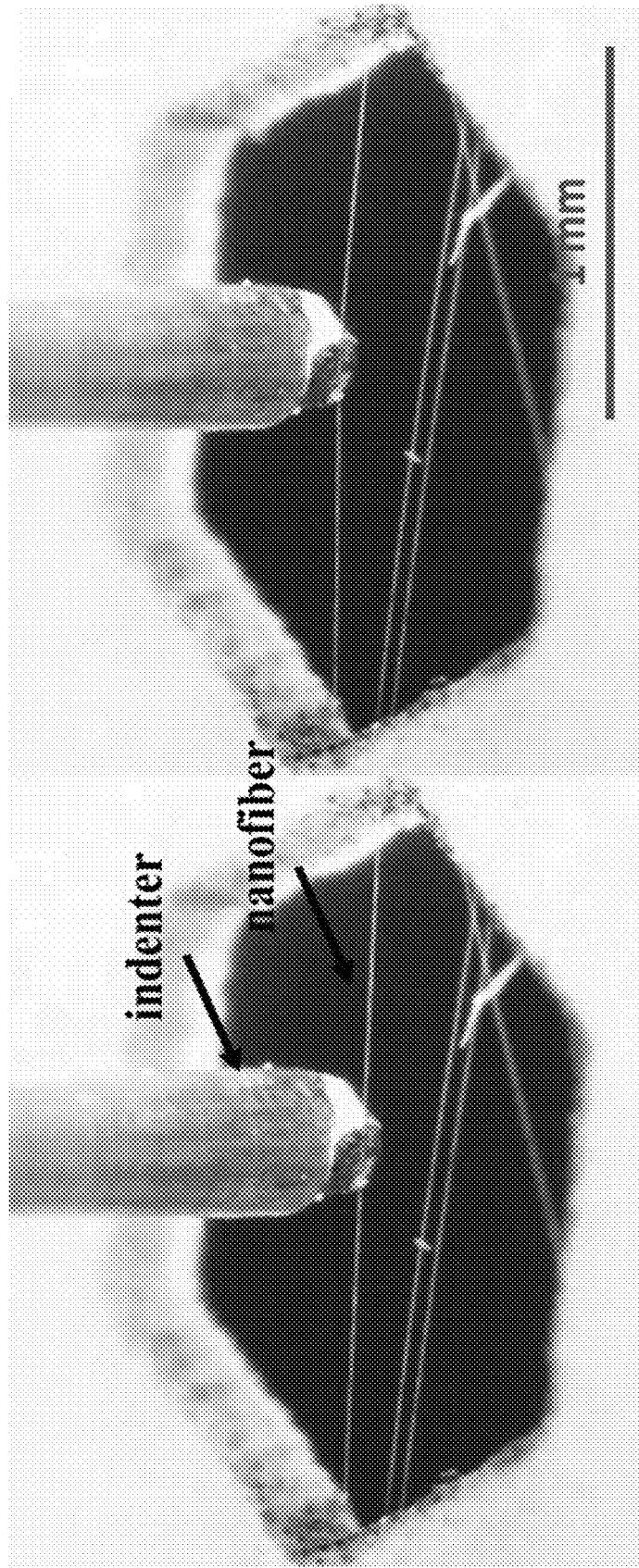
FIGS. 3(a) and 3(b) show images from a camera of a system, according to an embodiment of the subject invention, for monitoring an indentation process on a single nanofiber. A Berkovich indenter with an average radius of curvature of about 100 nanometers (nm) was utilized, and the diameter of the nanofiber ranges from 400 nm to 2 μm.
Figures 4A, 4B, 4C, 4D:
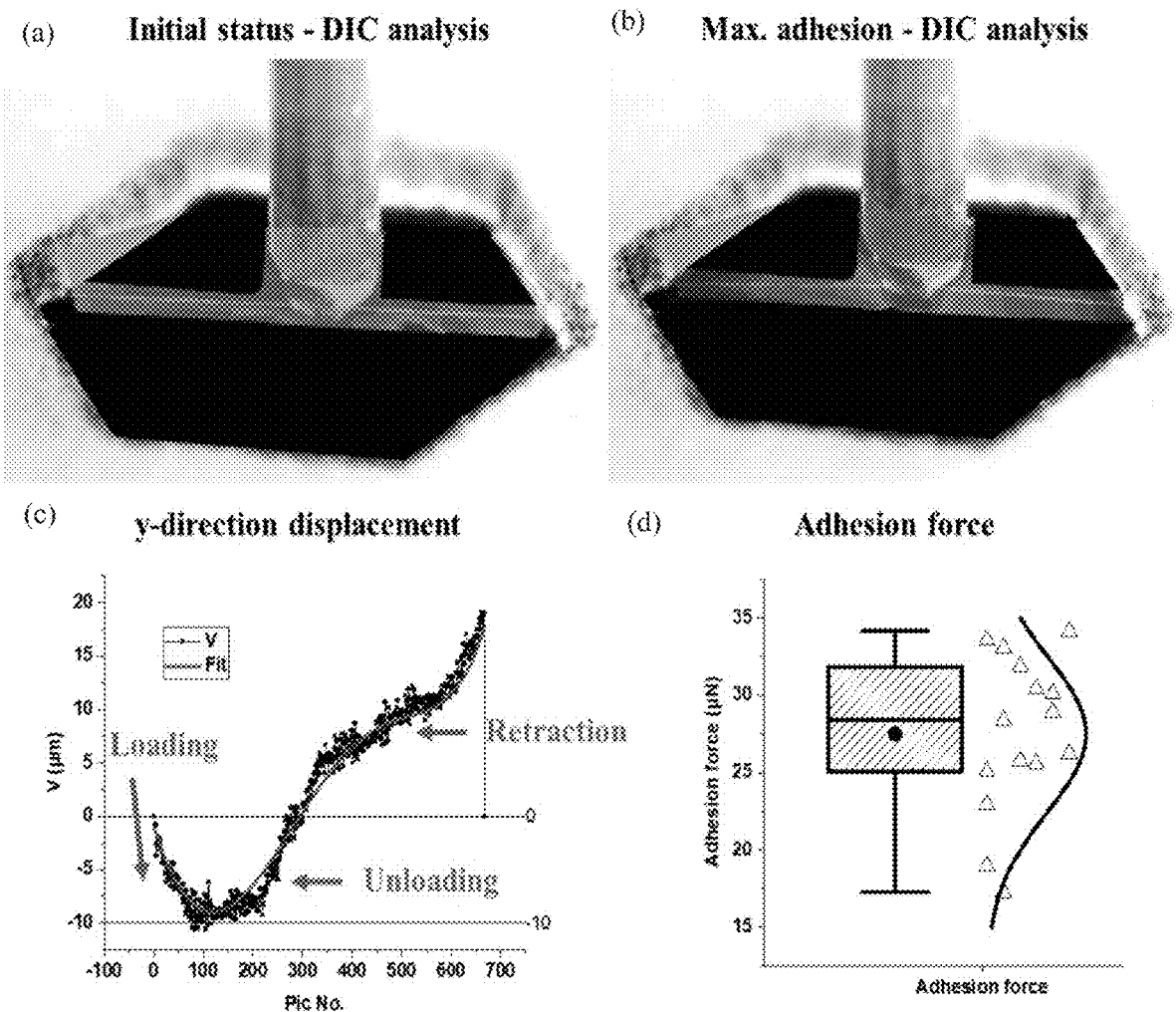
FIGS. 4(a)-4(d) show results of digital image analysis on videos from the nanofiber indentation device shown in FIGS. 3(a) and 3(b).
Figures 5A, 5B, 5C, 5D:
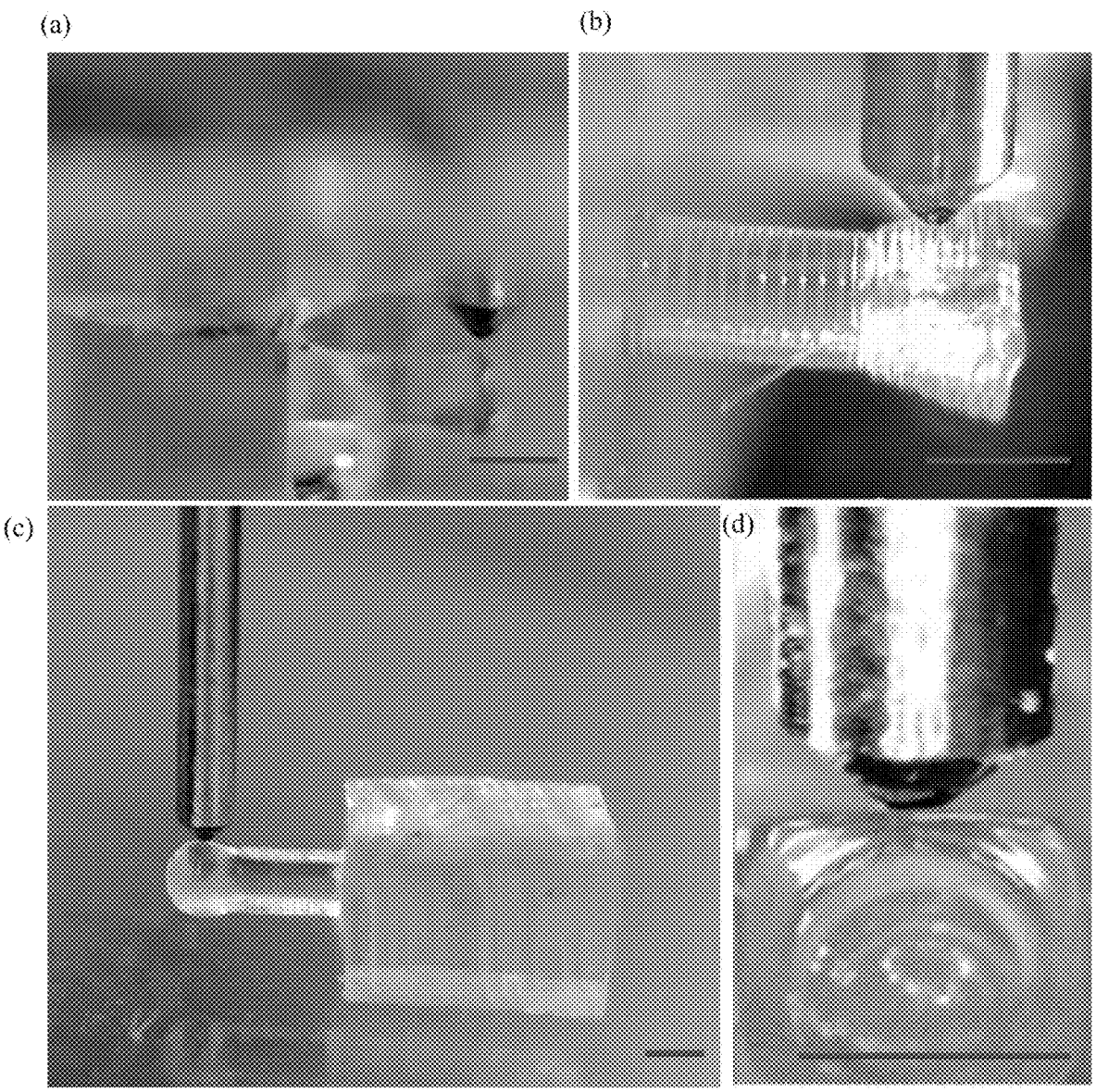
FIGS. 5(a)-5(d) show images from a dual camera system, according to an embodiment of the subject invention, for monitoring an indentation process on PDMS pillars at dry and wet conditions. The scale bar in each of FIGS. 5(a)-5(d) is 500 μm.

FIGS. 3(a) and 3(b) display clear adhesion between the indenter and a single nanofiber, observed by the bending of the single nanofiber. The obtained videos can be analyzed by a DIC technique, and the results are shown in FIGS. 4(a)-4(d). Referring to FIGS. 4(a)-4(d), a clear change in color of from the initial status (e.g., green color) to maximum adhesion (e.g., orange color) demonstrates the adhesion between the indenter and the nanofiber. Referring to FIG. 4(c), the y-direction displacement provides the detailed indentation process, including loading, unloading, and retraction, where retraction shows the non-linear and dynamic adhesion process (indenter and nanofiber separation process). Referring to FIG. 4(d), the adhesion force can be calculated, and the single poly(lactic-co-glycolic acid) (PLGA) nanofiber adhesion force was around 15 microNewtons (μN)-35 μN. The analyzed loading and unloading processes matched with the setting program, thereby validating the accuracy of the DIC technique.

FIGS. 5(a)-5(d) show images of an example where the multi-directional imaging system was used on the indentation process of PDMS micro-pillars; FIGS. 6(a)-6(c) show images of an example where the multi-directional imaging system was used on the indentation process of cardiac scaffolds; and FIGS. 7(a)-7(c) show images of an example where the multi-directional imaging system was used on the indentation process of porcine tissues.

Embodiments of the subject invention provide in situ non-invasive multi-directional imaging systems in coupling with indentation and DIC techniques. Embodiments can: provide acquisition and analysis of high-resolution interfacial contact between soft matter and an indenter; reveal unbiased details about the time-dependent force response (e.g., adhesion, viscoelasticity) of soft matter; form a 3D model based on acquired frames and targeted regions; analyze dynamic force mechanisms using the 2D/3D DIC technique; and utilize native or engineered tissues, 2D/3D scaffolds, polymers, and/or nanofibers.

The imaging system can be housed with a user-specific portable high-resolution camera system that can be removed and integrated with any mechanical instrument. The microcontroller-based control unit can automatically synchronize the cameras to acquire data as testing begins. The acquired images and the live feed can be displayed on a display (e.g., a main screen) and upon completion of the acquisition, data can be automatically processed according to the user's needs/preferences. Additionally, the versatile system overcomes difficulties and barriers faced with scanning electron microscope (SEM) systems, contributing to a more comprehensive understanding of multi-directional "soft" matter fatigue and viscoelastic mechanisms. Optical coherence mechanography (OCM) can be combined with the imaging system to provide multi-plane dynamic mechanical responses. Overall, the in situ multi-directional imaging system is non-invasive, waveless, economical, portable, and user-specific (e.g., quantity of cameras and frames per second).

Multi-directional soft matter mechanics is an underdeveloped arena, and embodiments of the subject invention address this by enabling the capture of real-time soft matter deformation from all axes and processing of data acquired in the process using DIC techniques. Features such as portability, minimization of pre-processing, and user-specificity enable the systems and methods of embodiments of the subject invention to capture interfacial in situ dynamic measurements. No related art systems or methods use such in situ multi-directional imaging that can be combined with an indentation device to explore soft matter dynamic force response. The in situ multi-directional imaging systems of embodiments of the subject invention fill a significant gap in soft matter mechanical characterization, contributing to a more comprehensive understanding of multi-directional "soft" matter elastic, fatigue, and viscoelastic mechanisms. Additionally, the imaging systems can enable the development of a soft matter mechanics map, similar to Ashby's map. This type of information can guide material screening for tissue engineers and other researchers aiming to fabricate bio-scaffolds for tissue modeling, implantation, and tissue regeneration.

FIG. 8 shows a schematic view of a multi-camera (e.g., six-camera) system coupled with an indentation device, according to an embodiment of the subject invention. Referring to FIG. 8, a sample stage 8 can have a sample 7 (e.g., a soft matter sample, such as a biological sample) disposed thereon and can be disposed on a surface that can include holes 9 for adjusting camera positions based on the type of sample 7. The system can include an indenter device 6 and a plurality of cameras 3a,3b,3c,3d,3e,3f, each of which can be attached to an adjustable stand 4 (e.g., via an optional connector 5, such as a spheroid connector). The system can include a central control unit 1 and a display 2 in operable communication with the central control unit 1. The central control unit 1 and/or the display 2 can be in operable communication with the cameras 3a,3b,3c,3d,3e,3f and/or the indenter device 6. The central control unit 1 can control the cameras 3a,3b,3c,3d,3e,3f and/or the indenter device 6, and/or the central control unit 1 can run the DIC technique on the images obtained from the cameras 3a,3b,3c,3d,3e,3f to determine the structure and/or mechanics (e.g., dynamic mechanics) of the sample 7. The images and/or other testing results can be displayed on the display 2. The cameras 3a,3b,3c,3d,3e,3f can be moved to different locations (e.g., using the holes 9 and/or stands 4) depending on the user preferences/needs (e.g., related to the particular sample 7). Also, though six cameras 3a,3b,3c,3d,3e,3f are shown in FIG. 8, this is for exemplary purposes only and should not be construed as limiting; any number of cameras can be used (e.g., 2, 3, 4, 5, 6, 7, 8, 9, 10, or more), depending on the user preferences/needs (e.g., related to the particular sample 7). Also, each individual camera 3a,3b,3c,3d,3e,3f can have its height adjusted via the stand 4 on which it is disposed and/or have the direction in which it is facing adjusted (e.g., by turning it on the stand 4, such as via the connector 5, if present). As seen in FIG. 8, the indenter device 6 can have a base attached to the sample stage 8, an arm attached to the base, and an indenter probe (that is used to indent the sample 7) attached to the arm. That is, the base of the indenter device 6 is static in use as it is attached to the sample stage 8. In addition, as seen in FIGS. 1, 2, 3(a), 3(b), 4(a), 4(b), 5(b)-5(d), 6(a)-6(c), 7(a), 7(b), and 8, the indenter probe is perpendicular to an upper surface of the sample 7 and an upper surface of the sample stage 8 as it indents the sample 7.

Embodiments of the subject invention can benefit indentation device developers. Most indentation devices are designed for hard or rigid materials, but the in situ multi-directional imaging systems can be readily adopted by developers for biological material indenters to upgrade their existing design and augment their devices. The in situ multi-directional imaging systems of embodiments can also benefit the biomedical, mechanical, biology, material, and tissue engineering industries.

Embodiments of the subject invention provide a focused technical solution to the focused technical problem of imaging soft matter during in situ indentation. Embodiments of the subject invention improve the indentation device by enabling imaging of soft matter in wet and dry conditions. Embodiments provide in situ multi-directional imaging systems coupled with an indentation device for deciphering the structure and dynamic mechanics of soft matter.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., sub-ranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for multi-directional imaging during an indentation of a sample, the system comprising:
   a central control unit;
   a display in operable communication with the central control unit;
   a sample stage on which the sample is disposed;
   an indenter device attached to the sample stage; and
   a plurality of cameras disposed on the sample stage and in operable communication with the central control unit;
   the plurality of cameras comprising:
   a first camera configured to capture first images of a first view of the sample being indented by the indenter device; and
   a second camera configured to capture second images of a second view of the sample being indented by the indenter device,
   the central control unit being configured to receive a plurality of images from the plurality of cameras and perform a digital image correlation (DIC) process on the plurality of images to determine mechanical properties of the sample,
   the first view being different from the second view,
   the plurality of images comprising the first images and the second images,
   the sample stage comprising an upper surface comprising a plurality of holes,
   each camera of the plurality of cameras being disposed on a stand that is removably inserted into a hole of the plurality of holes, and
   an indenter probe of the indenter device being configured to indent an upper surface of the sample while being perpendicular to both the upper surface of the sample stage and the upper surface of the sample.

2. The system according to claim 1,
   the indenter device comprising a base disposed on the sample stage, an arm attached to the base, and the indenter probe attached to the arm, and
   the sample stage being disposed below the indenter probe of the indenter device.

3. The system according to claim 1, the sample being a soft matter sample.

4. The system according to claim 1, the sample being a biological sample.

5. The system according to claim 1, the first view capturing a position of the indenter device in the sample along a first direction, and the second view capturing a position of the indenter device in the sample along a second direction perpendicular to the first direction.

6. The system according to claim 1, the first images and the second images being displayed on the display.

7. The system according to claim 1, the system being configured to operate during in situ multi-directional imaging for both a wet condition and a dry condition during the indentation of the sample.

8. The system according to claim 1, the plurality of cameras further comprising a third camera configured to capture third images of a third view of the sample being indented by the indenter device, the third view being different from the first view and the second view, and the plurality of images further comprising the third images.

9. The system according to claim 8, the plurality of cameras further comprising:

a fourth camera configured to capture fourth images of a fourth view of the sample being indented by the indenter device;

a fifth camera configured to capture fifth images of a fifth view of the sample being indented by the indenter device; and a sixth camera configured to capture sixth images of a sixth view of the sample being indented by the indenter device, the first view, the second view, the third view, the fourth view, the fifth view, and the sixth view all being different from each other, and the plurality of images further comprising the fourth images, the fifth images, and the sixth images.

10. A method for multi-directional imaging during an indentation of a sample, the method comprising:

providing a system comprising a central control unit, a display in operable communication with the central control unit, a sample stage on which the sample is disposed, an indenter device attached to the sample stage, and a plurality of cameras disposed on the sample stage and in operable communication with the central control unit, the indenter device comprising a base disposed on the sample stage, an arm attached to the base, and an indenter probe attached to the arm;

indenting an upper surface of the sample with the indenter probe of the indenter device;

capturing, by a first camera of the plurality of cameras, first images of a first view of the sample being indented by the indenter probe of the indenter device;

capturing, by a second camera of the plurality of cameras, second images of a second view of the sample being indented by the indenter probe of the indenter device;

receiving, by the central control unit, a plurality of images from the plurality of cameras; and performing, by the central control unit, a digital image correlation (DIC) process on the plurality of images to determine mechanical properties of the sample, the first view being different from the second view, the plurality of images comprising the first images and the second images, the sample stage comprising an upper surface comprising a plurality of holes, each camera of the plurality of cameras being disposed on a stand that is removably inserted into a hole of the plurality of holes, and the indenting of the upper surface of the sample comprising indenting the upper surface of the sample with the indenter probe of the indenter device while the indenter probe is perpendicular to both the upper surface of the sample stage and the upper surface of the sample.

11. The method according to claim 10, the sample being a soft matter sample.

12. The method according to claim 10, the sample being a biological sample.

13. The method according to claim 10, the first view capturing a position of the indenter device in the sample along a first direction, and the second view capturing a position of the indenter device in the sample along a second direction perpendicular to the first direction.

14. The method according to claim 10, further comprising displaying the first images and the second images on the display.

15. The method according to claim 10, the method being performed during in situ multi-directional imaging for both a wet condition and a dry condition during the indentation of the sample.

16. The method according to claim 10, the plurality of cameras further comprising a third camera configured to capture third images of a third view of the sample being indented by the indenter device, the third view being different from the first view and the second view, and the plurality of images further comprising the third images.

17. The method according to claim 16, the plurality of cameras further comprising:

a fourth camera configured to capture fourth images of a fourth view of the sample being indented by the indenter device;

a fifth camera configured to capture fifth images of a fifth view of the sample being indented by the indenter device; and a sixth camera configured to capture sixth images of a sixth view of the sample being indented by the indenter device, the first view, the second view, the third view, the fourth view, the fifth view, and the sixth view all being different from each other, and the plurality of images further comprising the fourth images, the fifth images, and the sixth images.

18. A system for multi-directional imaging during an indentation of a sample, the system comprising:

a central control unit;

a display in operable communication with the central control unit;

a sample stage on which the sample is disposed;

an indenter device attached to the sample stage, the indenter device comprising a base disposed on the sample stage, an arm attached to the base, and an indenter probe attached to the arm, the sample stage being disposed below the indenter probe of the indenter device, and an upper surface of the sample stage comprising a plurality of holes; and a plurality of cameras disposed on the sample stage and in operable communication with the central control unit;

the plurality of cameras comprising:

a first camera configured to capture first images of a first view of the sample being indented by the indenter device;

a second camera configured to capture second images of a second view of the sample being indented by the indenter device;

a third camera configured to capture third images of a third view of the sample being indented by the indenter device, a fourth camera configured to capture fourth images of a fourth view of the sample being indented by the indenter device;

a fifth camera configured to capture fifth images of a fifth view of the sample being indented by the indenter device; and a sixth camera configured to capture sixth images of a sixth view of the sample being indented by the indenter device, the central control unit being configured to receive a plurality of images from the plurality of cameras and perform a digital image correlation (DIC) process on the plurality of images to determine mechanical properties of the sample, the first view, the second view, the third view, the fourth view, the fifth view, and the sixth view all being different from each other, and the plurality of images comprising the first images, the second images, the third images, the fourth images, the fifth images, and the sixth images, the sample being a soft matter sample, each camera of the plurality of cameras being disposed on a stand that is removably inserted into a hole of the plurality of holes, the first view capturing a position of the indenter in the sample along a first direction, the second view capturing a position of the indenter device in the sample along a second direction perpendicular to the first direction, the first images, the second images, the third images, the fourth images, the fifth images, and the sixth images being displayed on the display, the system being configured to operate during in situ multi-directional imaging for both a wet condition and a dry condition during the indentation of the sample, and the indenter probe of the indenter device being configured to indent an upper surface of the sample while being perpendicular to both the upper surface of the sample stage and the upper surface of the sample.

\* \* \* \* \*